United States Patent [19]

Kepley et al.

[11] Patent Number: 5,315,589
[45] Date of Patent: May 24, 1994

[54] TDMA SYNCHRONIZATION USING VISIBILITY DESIGNATION

[75] Inventors: W. Robert Kepley, Gaithersburg; Stanley E. Kay, Rockville; Ashim Roy, North Potomac; Steven M. Kee, Rockville; Carle C. Henson, III, Damascus; Adrian J. Morris; Randy Drago, both of Gaithersburg, all of Md.

[73] Assignee: Hughes Aircraft Company, Los Angeles, Calif.

[21] Appl. No.: 770,206

[22] Filed: Oct. 3, 1991

[51] Int. Cl.⁵ .................................. H04Q 11/04
[52] U.S. Cl. ........................... 370/62; 379/157
[58] Field of Search .............. 370/62, 61, 95.1, 95.3, 370/104.1, 105.1, 75; 379/158, 157, 156, 160, 201, 202; 455/53, 54, 56, 53.1, 54.1, 54.2, 56.1

[56] References Cited

U.S. PATENT DOCUMENTS

| | | |
|---|---|---|
| 4,507,781 | 3/1985 | Alvarez, III et al. ............ 370/95.3 |
| 4,586,177 | 4/1986 | Kaul ...................................... 370/75 |
| 4,686,673 | 8/1987 | Hotta ................................ 370/104.1 |
| 4,688,216 | 8/1987 | Saburi .................................. 370/105 |
| 4,731,783 | 3/1988 | Fontanes ......................... 370/104.1 |
| 4,796,293 | 1/1989 | Blinken et al. ........................ 370/62 |
| 4,800,561 | 1/1989 | Ishi ...................................... 370/95.3 |
| 4,888,769 | 12/1989 | Deal ................................... 370/95.3 |
| 4,931,802 | 6/1990 | Assal et al. ............................ 370/57 |

Primary Examiner—Douglas W. Olms
Assistant Examiner—Dang Ton
Attorney, Agent, or Firm—Gordon R. Lindeen, III; William J. Streeter; Wanda K. Denson-Low

[57] ABSTRACT

TDMA timing is maintained by the use of visibility information transmitted among the stations in a conference. Each station monitors the identity of stations from which bursts are received. A station also receives visibility information from other stations. The station combines the information to maintain a two-dimensional Visibility Designator Byte matrix or array. A station participates in the process by periodically transmitting its own VDB array to other stations. The stations then, independently, identify a prime station by using the collected and processed information. Using the same information, a station also identifies the manner in which it will lock to the timing of the prime station.

23 Claims, 6 Drawing Sheets

| LEVEL | XMIT / RCVR | 1 | 2 | 3 | 4 | 5 | 6 |
|---|---|---|---|---|---|---|---|
| 3 | 1 | 1.1 | 1.2 | 1.3 | 1.4 | 1.5 | 1.6 |
| 3 | 2 | 2.1 | 2.2 | 2.3 | 2.4 | 2.5 | 2.6 |
| 1 | 3 | 3.1 | 3.2 | 3.3 | 3.4 | 3.5 | 3.6 |
| 2 | 4 | 4.1 | 4.2 | 4.3 | 4.4 | 4.5 | 4.6 |
| 4 | 5 | 5.1 | 5.2 | 5.3 | 5.4 | 5.5 | 5.6 |
| 2 | 6 | 6.1 | 6.2 | 6.3 | 6.4 | 6.5 | 6.6 |

TDMA SYNCHRONIZATION USING VISIBILITY DESIGNATION

DESCRIPTION

1. Technical Field

The present invention relates to TDMA synchronization using visibility designation, and more particularly, relates to a method and apparatus for distributing information among the stations in a TDMA network which allows the stations to independently determine the identity of the prime station and how they will each lock their timing to the timing originated by the prime station in order to insure proper TDMA timing.

2. Background Art

Proper timing is essential for operation of a TDMA system. For example, a station entering a system already in operation must be in a position to properly time its burst relative to the preexisting frame. The prior art, in order to satisfy this function, has used a reference station. The entering station can derive appropriate timing from a burst transmitted by the reference station.

Since the function of the reference station in a TDMA system is essential, there are many schemes which are used to provide a backup for the replacement of a failing or inadequate reference station. To have an orderly transition from the functioning of a given station as the reference to an alternate, it is important that there is a well defined set of rules which unequivocally establishes when this transition is to occur and which also identifies the station which will be the new reference station.

Achieving this function at a given station is inadequate: what is necessary is that there be some consensus among all the stations in the system with respect to identifying the new reference station. Implementing this function in the prior art requires a delay for the purpose of communicating information.

SUMMARY OF THE INVENTION

In order to eliminate this communication delay, in one aspect the invention provides each of the stations in the network with data and logic to select the station from which TDMA timing is based. However, it is still necessary to insure that all of the stations will operate on identical or substantially identical data in the selection function.

Many prior art TDMA systems exhibit at least two classes of stations. One class of the stations has the capability to perform the basic communication function of transmitting and receiving traffic, i.e. messages destined for, or received from, other stations. Another class of stations has this basic communication function capability as well as the capability to become the reference station. It is typical for the second class of stations to use a higher power transmissions so as to provide a robust signal from the reference station. However, as TDMA communication systems become more common, there is a desire to eliminate this distinction and have only stations of one class in the system. As a consequence, stations will tend to operate with lower margins and therefore transient outages caused, for example by weather variations, will become more and more common. In order to maintain robustness, the system should have the ability to operate through these periods of occasional and unpredictable station outages. This is aided, of course, by the ability to dynamically alter the manner in which TDMA timing is distributed in response to transient events. However, when a large number (or all) of the stations operate with low margins, it is foreseeable that not all of the stations will be visible to all of the other stations. In the context of this invention, station A is visible to station B when station B receives transmissions from station A via the orbiting transponder. This failure of visibility will impede the reference station replacement function since it presents an obstacle to the requirement of ensuring that all (or substantially all) of the stations operate the replacement function with the same or equivalent data.

According to another aspect of the invention, this problem is overcome as follows. Each of the stations monitors "local visibility" conditions. In other words, each station periodically monitors which of the other stations it sees (or receives a signal from) and which of the other stations it does not see (or does not receive a signal from). This operation, in part, has the effect of providing data to the stations for use in the reference station replacement function. In order to further sharing of this data among the stations, data collected by each of the stations is transmitted to other stations. However, even this is not the required solution. If station A cannot "see" station B then, of course, it will not receive data from station B identifying stations visible to station B. Clearly, the inability of station A to "see" station B suggests that one of these stations may not be the most appropriate candidate for a reference station replacement. However, which is the inappropriate candidate is undetermined. According to this aspect of the invention, each station determines relative visibility of other stations, i.e. if station A cannot "see" station B, it will nevertheless receive and collate data from other stations on whether or not they can "see" both itself (station A) as well as whether or not they can "see" station B.

More particularly, each of the stations in the network maintains information respecting which stations are visible to each of the other stations in the network. At any one station, this information is only directly available for the stations visible to the one station. (This, for example, could be termed "local visibility".) Additional information at the one station, identifies visibility between other pairs of the stations and is obtained by information transmitted by respective other ones of the stations.

In many prior art TDMA systems, there was a requirement that each non-reference TDMA station be able to "see" the reference TDMA station so that, based on its receipt of the reference marker (transmitted by the reference TDMA station), the receiving station could properly time its transmission burst. While this is a common feature of many prior art TDMA systems, it is not essential to implement the TDMA process. A station which cannot receive the reference marker from the reference TDMA station may nevertheless properly time its transmission burst if that station can receive a burst from some other station which itself is receiving the reference marker from the reference TDMA station. This method of indirect timing is not limited to a single level of indirection, but rather can be extended to additional levels of indirection (perhaps with some timing ambiguity penalty paid for each level of indirection). This process of using indirect timing is employed in the present invention. More particularly, in accordance with the present invention a station determines the identity of a so-called prime station. The prime station is a station that the computing station will lock to (for timing purposes) either directly or indirectly. In order to implement the TDMA function, each of the stations in the network computes the identity of a prime station. The prime station will be the station from which TDMA timing is derived. It is not essential for the prime station to be visible to each of the other stations in the network. If in fact the prime station is not visible to a given station, the given station can nevertheless base its TDMA timing on the timing generated by the prime station if the given station can lock to another station at which the prime station is visible. There is no reason why this indirect locking need be limited to a single stage of indirection and, if necessary, multiple stages of indirect locking can be employed. In the example described below, each of the four stations in a 4-station network identifies, at a particular instant in time, that station 4 shall be the prime station. While station 4 is identified as the prime station, in fact station 4 is not visible at stations 1 and 3. Rather, stations 1 and 3 lock their TDMA timing to station 4 via station 2, at which station 4 is visible. Thus, in a 4-station network, station 4 (the prime station) is locked to itself, station 2 is directly locked to station 4, and stations 1 and 3 indirectly lock to station 4 via station 2.

In order to implement this processing, a two-dimensional array of Visibility Designator Bytes (VDB) is maintained at each station which contains information about network visibility. The value of an array element VDB (K, L) represents whether site K can "see" site L. VDB values are either unity (indicating visibility) or zero (indicating lack of visibility). A station constructs the VDB array by using data from a three-dimensional $VDB_{rcvd}$ array.

Upon conference creation, it is assumed that all defined stations can see all others. Therefore, each station sets the value $VDB_{rcvd}$ (LEVEL, K, L)=0 for all stations (either K or L) which are not defined in the conference and for all levels. The stations all set $VDB_{rcvd}$ (LEVEL, K, L)=1 for all levels and for all stations defined in the conference. Two of the three dimensions of this three-dimensional array are identical to the two dimensions of the VDB array. The third dimension is a "level" or index. Level 0 indicates local visibility, i.e. an entry for $VDB_{rcvd}$ (O, K, L) indicates whether site K can directly see site L. Level 1 data indicates that the station at which the entry was made has received a report from station K, that station K can see station L, i.e. a first level of indirection. Likewise, an entry at level 2 indicates that the station at which the entry was made has received a report from some other station (other than station K) reporting that the other station has received a report from station K that station K can see station L, i.e. a second level of indirection.

Having initialized $VDB_{rcvd}$, it is maintained based on two inputs. A first input for maintaining $VDB_{rcvd}$ is the receipt of a burst from another station. $VDB_{rcvd}$ (O, LST, I)=minimum ($VDB_{rcvd}$(O, LST, I)+0.125, 1.0) if a burst was detected in slot I at the station LST.

The foregoing means that the entry in the three-dimensional array at the identified location at station LST is incremented from whatever it was, by the value 0.125, up to a maximum of 1.0 only if a burst was detected in slot I. The incrementing process is carried out each time a burst is detected at LST in slot I.

Likewise, at LST, the entry at level 0 is $VDB_{rcvd}$ (O, LST, I)=maximum ($VDB_{rcvd}$(O, LST, I)−0.125, 0.0) if a burst was not detected in slot I. In other words, the entry is decremented by 0.125 from its previous entry if a burst was not detected in slot I on any occasion for slot I with the limitation that the entry cannot be decremented below 0.0.

A second piece of information used to maintain $VDB_{rcvd}$ is the receipt of VDB information from other stations in the conference. As will be described below, part of each station's burst includes data from its own VDB array. When this information is received, an entry is made at the appropriate element of $VDB_{rcvd}$. More particularly, $VDB_{rcvd}$ (Level, ID, I)=minimum {$VDB_{rcvd}$(Level, ID, J)+0.125 1.0} at the station LST if ID is not equal to LST; for J=1 through the number of stations if the received $VDB_{rcvd}$(Level, ID, J)=1. In other words, the entry at the specified location (Level, ID, I) in a three-dimensional array is incremented by the value 0.125 if the received VDB value is actually equal to one, but the resulting value in the three-dimensional array can be incremented only up to a maximum of 1.0. On the other hand, $VDB_{rcvd}$ (Level, ID, I)=maximum {$VDB_{rcvd}$(Level, ID, J)−0.125, 0.0} at the station LST if ID is not equal to LST; for J=1 through the number of stations if the received VDB (Level, ID, J) equals zero. In other words, the value at the associated entry in the three-dimensional array (Level, ID, I) is decremented by 0.125 if the received VDB has a zero at that location, but the value is only decremented down to 0.0.

Furthermore, periodically, such as once every NS (where NS =the number of TDMA slots) frames (superframe), each entry in the three-dimensional array, is treated as follows.

$VDB_{rcvd}$ (J, K, L)=minimum ($VDB_{rcvd}$ (J, K, L)−0.0625, 0.0} for J, K, L where J=0 to NS−1, K and L vary from 1 to NS.

In other words, once every superframe, each entry is decremented by 0.0625 (but only down to 0.0). This ensures that an indirect visibility report is limited in lifetime. (The decimal value 0.0625 is equal to 1/16.)

In the foregoing:
Level=level of $VDB_{rcvd}$; when Level=0 is direct and otherwise (Level≠0) is indirect
I=current TDMA slot identification,
LST=local station TDMA slot,
NS=number of TDMA slots,
ID=identification of station whose VDB has been provided.

In summary, the data collection procedure is as follows. Initially, $VDB_{rcvd}$ is initialized with unity values for those stations which are to take part in the conference and with zero values for other stations. As the conference is initiated, those stations which detect bursts from other stations update $VDB_{rcvd}$ corresponding to the received bursts. The resultant $VDB_{rcvd}$ (resulting from its initialized state as modified by the received bursts) is used to initially create and/or update VDB, as described below. Thereafter, the VDB information is transmitted among the stations. As time progresses, the effect of the data inserted into $VDB_{rcvd}$ is discounted by the periodic decrementing operation. At some fixed time after initiation of the conference, $VDB_{rcvd}$ no longer contains any of the initializing information, i.e. that initializing information has now been decremented to zero. However, the process of adding information into $VDB_{rcvd}$ based both on the detection of a burst from a given station and the VDB information transmitted by the stations, continues and the resulting $VDB_{rcvd}$ is used to maintain VDB.

Periodically the $VDB_{rcvd}$ array is used to update the two-dimensional VDB array. Each station transmits, in its burst, a segment (particularly 1/NS of the entire array) of its VDB array. Therefore, it takes a number of frames for any station to transmit the entire VDB array to the other stations. This duration (the number of frames) then determines the periodicity at which a VDB array is updated. In the example described herein, each active station in the conference has one burst per frame, and therefore it takes NS (the number of potential stations in the conference) frames to transmit the entire VDB array. Therefore, once every NS frames, the three-dimensional $VDB_{rcvd}$ array is used to update the two-dimensional VDB array as follows.

(a) For each station ID, all levels of the $VDB_{rcvd}$ array (beginning with level 0) are searched for the first non-zero row of $VDB_{rcvd}$ elements (with a given station ID). This provides VDB data about that station ID from the most direct source available, i.e. the lowest level and therefore the least amount of indirection.

(b) The row of $VDB_{rcvd}$ elements found is then used to update the two-dimensional VDB array as follows.

The information in $VDB_{rcvd}$ is the most current information available at the station regarding the visibility between any two pair of stations in the conference. The information is recorded numerically, lying somewhere between a lower bound of zero (indicating non-visibility) and an upper bound of unity (indicating visibility). The information actually is a sum of the most current information collected in the most recent NS frames, along with older information (collected in frames preceding the most recent NS frames), but the older information has been discounted by the decrementing function. Information from the $VDB_{rcvd}$ array is applied to update the VDB array using a hysteresis function. More particularly, a VDB value of zero (indicating non-visibility) will not be changed to a value of unity (indicating visibility) unless the value in the $VDB_{rcvd}$ array is at least two-thirds. Likewise, a VDB value indicating visibility (unity) will not be changed to a value (zero) indicating lack of visibility unless the value in the $VDB_{rcvd}$ array is less than one-third. Accordingly, in order to update the VDB array, the value of a VDB element is determined. If the value is zero, it will remain zero unless the corresponding element in $VDB_{rcvd}$ is at least two-thirds. Similarly, if the element in the VDB array is unity, it will not be changed to zero unless the corresponding value in $VDB_{rcvd}$ is less than one-third.

(c) The indirection level which is identified (in step a) is then incremented and inserted into the VDB array. In other words, assuming that the most direct information available at a given station is level 2, when that array element is used to update VDB, it is stored (and later retransmitted) with level 3.

(d) The resulting VDB array is transmitted by each station to all others during its transmission. As has already been indicated in the example described herein, that portion of the VDB array relating to a single station is transmitted in any burst and therefore it takes NS bursts to transmit the entire VDB array. This of course is not essential to the practicing of the invention and the VDB array can be sent at a higher or lower rate than described in the preferred embodiment.

Having acquired, processed and distributed this visibility information, it can now be used. Typically, the information is used periodically to identify a prime station and the manner in which the station at which the computation is proceeding will lock to the timing of that prime station. In the example described herein, since it takes NS frames for the VDB information to be distributed, this processing is performed once per NS frames.

The procedure used is as follows.

A total visibility matrix (VDT) is computed which indicates the direct and indirect visibility of each station. Based on the value (0 or 1) of the VDB, the VDT is computed as follows.

(a) Set VDT (K, J) = VDB (K, J); for J = 1, NS; K = 1, NS then (b) Compute VDT (K, L) = VDT (K, L) OR VDT (J, L); for L = 1, NS if VDT (K, J) = 1; for K = 1, NS; J = 1, NS. The operator OR is a logical OR function.

Whereas the VDB indicates which stations can see other stations (directly), the VDT indicates which stations can see other stations either directly or indirectly. Thus, for example, if a VDB array indicates that station 1 cannot see station 2, then the VDB element at (1, 2) would be zero. However, if while station 1 cannot see station 2, it can see station 3, which in turn can see station 2, then whereas the VDB (1, 2) = 0, on the other hand, VDT (1, 2) = 1.

After computing the VDT matrix, a MAX vector is computed as the sum of the elements of the VDT matrix as follows.

$$MAX(J) = \sum_{K=1}^{NS} VDT(K,J); J = 1, NS$$

Thereafter a prime TDMA station is selected for TDMA synchronization as follows. The prime station is the station whose reference timing will be followed at the computing station by locking either directly or indirectly to that station.

First a prime station candidate is computed as the location of the first appearance of the largest value in the MAX vector;

Prime equals J where first maximum (MAX(J)); J = 1, NS.

If the candidate station can see itself (that is, VDB (J,J) = 1), it becomes the prime TDMA station. If not, another candidate is computed.

If a candidate station cannot be found, the local station selects itself as the prime site.

Having determined the identity of a prime station, next the method that the local station will use to lock to the prime station is determined. A local station can lock to the prime station either directly (if VDB (LST, Prime) = 1) or indirectly (if VDB (LST, Prime) = 0 but VDT (LST, Prime) = 1).

If the local station can directly see the prime station, then the direct lock method is used. Note that an additional test is performed where the local station which is directly locked to itself, alternately selects a lone station which can only see itself, as the prime station.

If the local station cannot directly see the prime station, a station is selected which provides an indirect lock to the prime station. This is performed by:

First, looking for a station (J) which can be seen directly by the local station (is VDB (LST, J) = 1).

Next, by checking to see if that station (J) can see the prime station directly (is VDB (J, prime) = 1).

If the foregoing tests are not satisfied for J = 1, NS, the tests are repeated but instead of looking for direct visibility (using VDB), indirect visibility (VDT) is employed.

Note that the station is not allowed to lock to itself via an indirect lock.

Having identified a prime station and having identified the station to which the local station (LST) will lock its timing to (LOC equals), the local station (LST) uses the burst from the station to which it is locked from which to time its own burst. Inasmuch as those skilled in the art are conversant with the technique of determining the burst timing at one TDMA station from the burst of another station, that procedure will not be specifically described herein. It should be understood that any conventional technique implementing this function can be used.

BRIEF DESCRIPTION OF THE DRAWINGS

Brief Description of the Drawings

The invention will now be described in the following portions of this specification so as to enable those skilled in the art to practice the same, when the following portions of the specification are taken in conjunction with the attached drawings in which.

DETAILED DESCRIPTION OF A PREFERRED EMBODIMENT

Figure 1:
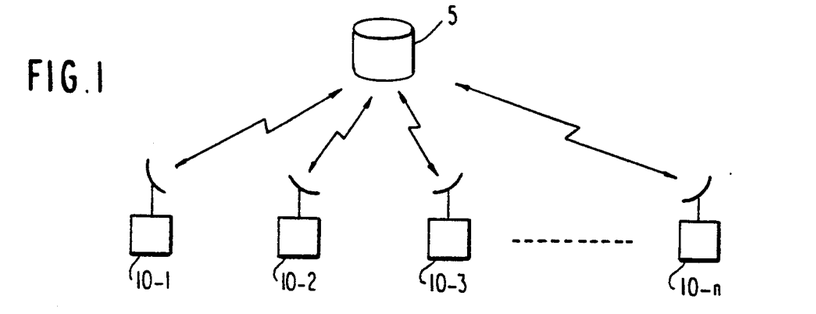
FIG. 1 is a schematic illustration of a typical TDMA system.
Figure 2A:
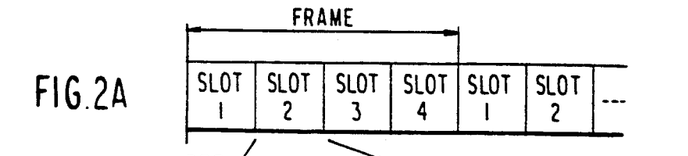
FIG. 2A shows the repeating TDMA frame relative to a reference marker Ref.

FIG. 1 illustrates a typical TDMA network wherein a plurality of stations 10-1 through 10-n communicate with each other using a geostationary orbiting satellite 5. As is conventional in the art, each of the stations 10-1 through 10-n transmit on an uplink carrier frequency in a particularly precise time ordered sequence. The orbiting satellite 5 receives the transmissions of the various stations and transmits them on a different downlink frequency for receipt by each of the stations. Typically, each of the stations transmits in a predetermined one of a number of slots in a TDMA frame, as shown in FIG. 2A (those skilled in the art are aware that the slots need not be of equal duration). In order to place a station's transmission burst in the appropriate slot, the station must time that burst from a frame reference marker Ref. In other words, slot 1 is defined beginning simultaneously with Ref; slot 2 is delayed from Ref by the width of the first slot, slot 3 is delayed from Ref by the width of slots 1 and 2, etc. The reference mark, Ref, is defined at the orbiting satellite 5 and therefore the stations must take into account not only the respective delay from Ref to the beginning of their slot, but also the propagation delay from the station to the orbiting satellite 5. Ideally, each of the stations receives transmissions from all other stations. In the prior art, one of the stations had been designated a priori to be the reference station and it was the timing of the reference station's transmissions which established TDMA timing for all of the other stations. As used herein, the station whose timing will be used to determine TDMA timing is referred to as the prime station. The present invention is directed at situations in which, for one reason or another, all of the stations cannot receive signals from all of the other stations all the time. Furthermore, the circumstances which prevent a given station from receiving a signal from particular one of the other stations may be transitory. Under these circumstances, some technique is required for responding to this transitory phenomena in order to identify the appropriate one or ones of the stations to serve as the timing reference or the prime station. It is not necessary for all stations to be able to receive a signal from a prime station, so long as they can agree on an unambiguous reference. A given station which may not receive a signal from the prime station can still time its transmission from that station if the given station can receive a signal from another station which receives (either directly or indirectly) a signal from the prime station. Accordingly, in determining how the reference timing function will be implemented, each of the stations must also determine the identity of that one of the other stations upon which its timing will be locked. It would, of course, be disastrous if a first group of stations determined that station 1 was the reference, whereas a second group of stations determined that station 2 was the reference. Under these circumstances, the TDMA frame is subject to chaos occasioned by interfering bursts which would prevent the communication which is of course the whole purpose for the network. It would also be counterproductive if station 1 determined to lock to station 2, whereas station 2 determined to lock to station 1.

It is readily apparent that each station can determine the identity of the signals which it can directly receive. Unfortunately, that information is inadequate on which to operate, especially under the circumstances wherein the timing determination must be robust enough to handle transitory signal outages.

Figure 2B:
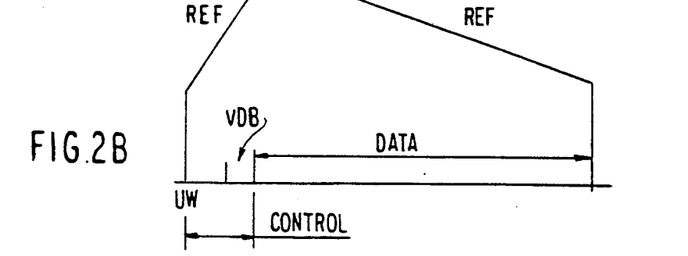
FIG. 2B shows a typical station burst including VDB data.
Figure 3:
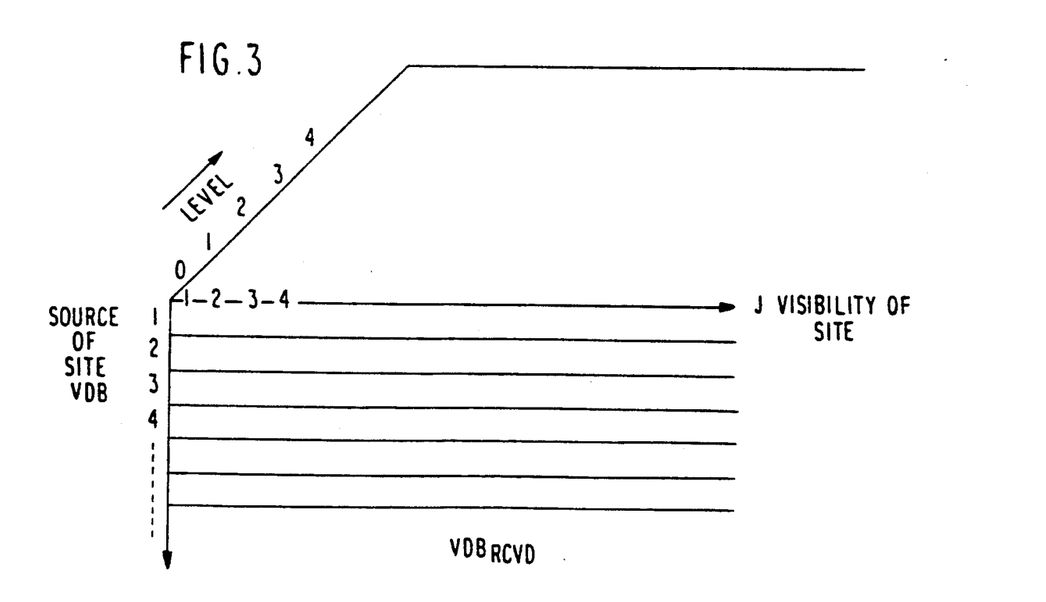
FIG. 3 illustrates the three-dimensional matrix $VDB_{rcvd}$.

In accordance with the invention, each station transmits (and therefore receives) information respecting not only the identity of those stations it can "see" (that is, receive signals from), but also transmits similar information received from other stations. More particularly, FIG. 2B shows a typical burst from a station. The burst is initiated with the station's Unique Word (UW), and it also includes additional data in a control portion of the burst. The burst is terminated with the data portion. One element of the control portion of the station's burst is the VDB information which, after having been processed in accordance with the following disclosure, is transmitted to the other stations in the network. Each station maintains three arrays for the purpose of collecting, collating and processing this visibility information. The first of the arrays, $VDB_{rcvd}$, is a three-dimensional array identifying, on one axis, a receiving station, on another axis, a transmitting station and on the third axis the level of indirection. That is, level 0 in this three-dimensional array identifies stations which are directly seen (or heard) by LST, the station storing the array. Level 1 identifies a visibility report which has been relayed to LST by another station. Level 2 indicates a visibility report which has been relayed to LST via two stations, etc. The array, $VDB_{rcvd}$ is maintained slot time by slot time. Levels 1 and higher are filled in response to information received from other stations. Thus, for example, in slot time 3, each other station in the network receiving a signal from station 3 will make an entry in its $VDB_{rcvd}$ array for station 3, level 0. In addition, each station receiving a report from station 3 may also update other levels in the array based on VDB information received from station 3. In order to transmit this VDB information, each station also processes the data in the array $VDB_{rcvd}$ in order to maintain a two-dimensional VDB array. More particularly, information extracted from $VDB_{rcvd}$ is used to maintain the VDB array. Information is selected for this purpose as information respecting the transmitting/receiving station pair at the lowest level of indirection. In addition to saving this piece of data in the appropriate location in the VDB array, information respecting the level of indirection is also saved. When a station's slot time occurs, it transmits the present state of its two-dimensional VDB array (or a segment thereof) for receipt by others of the stations so that they can update their $VDB_{rcvd}$ array and their own two-dimensional VDB array.

Periodically, for example once per NS frames (where NS=the number of slots in the frame), each of the stations identifies a new prime station and the manner in which it locks to that prime station. More particularly, this computation determines, in addition to the prime station, the identity of some other station (if the computing station cannot "see" the prime station) to which the computing station will lock. Because of the information communication process, the timing decisions made at the respective stations allow the TDMA process to continue.

Figure 5A:
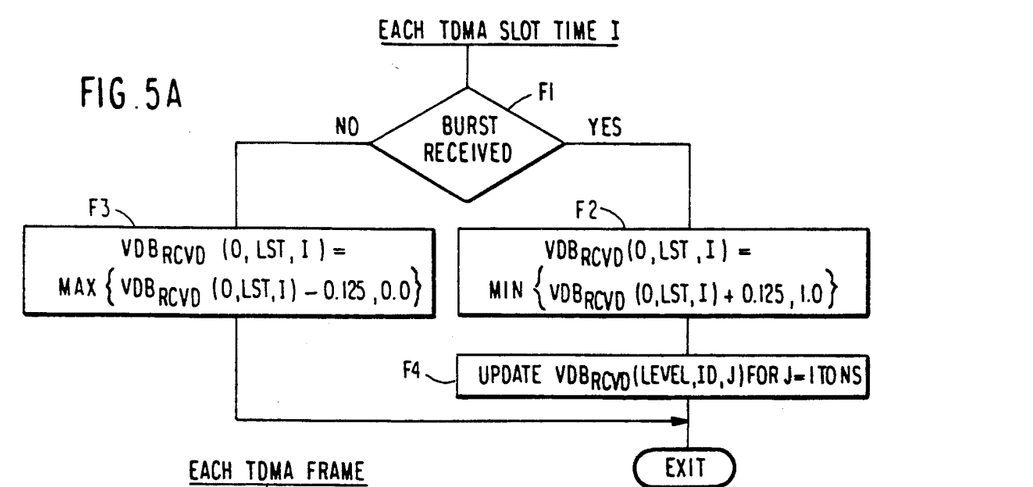
FIGS. 5A through 5C illustrate the processing which is employed to maintain $VDB_{rcvd}$ and FIG. 5D illustrates the transmission of VDB information.

FIG. 5A shows the processing performed at a given station, at each slot time I. Function F1 determines if a burst was received. If a burst was received, then function F2 is performed to update the appropriate entry (O, LST, I) in $VDB_{rcvd}$ where LST identifies the local station and I identifies the transmitting station. More particularly, based on the receipt of a burst from station I, the entry which has been defined is incremented by 0.125 up to a maximum of 1.0. On the other hand, if a burst was not received, then the same entry is decremented (F3) by 0.125 down to a minimum of 0.0. Following execution of function F2, function F4 is performed to update other information in the three-dimensional array $VDB_{rcvd}$ based on the information reported by station I. There are potentially as many entries as there are stations in the network.

Figure 5B:
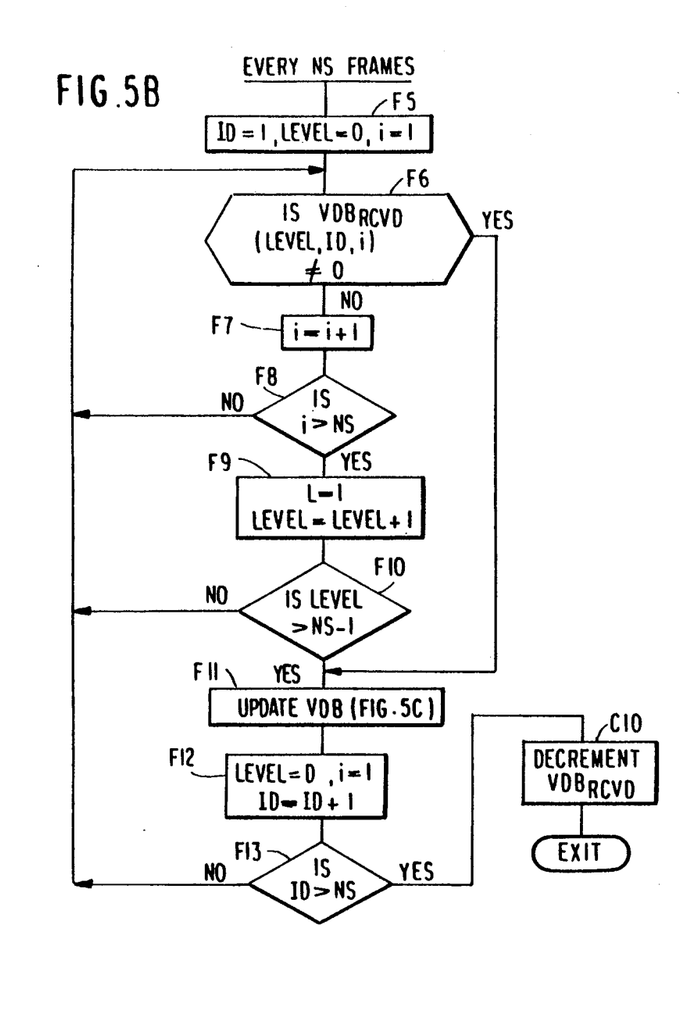
Figure 5C:
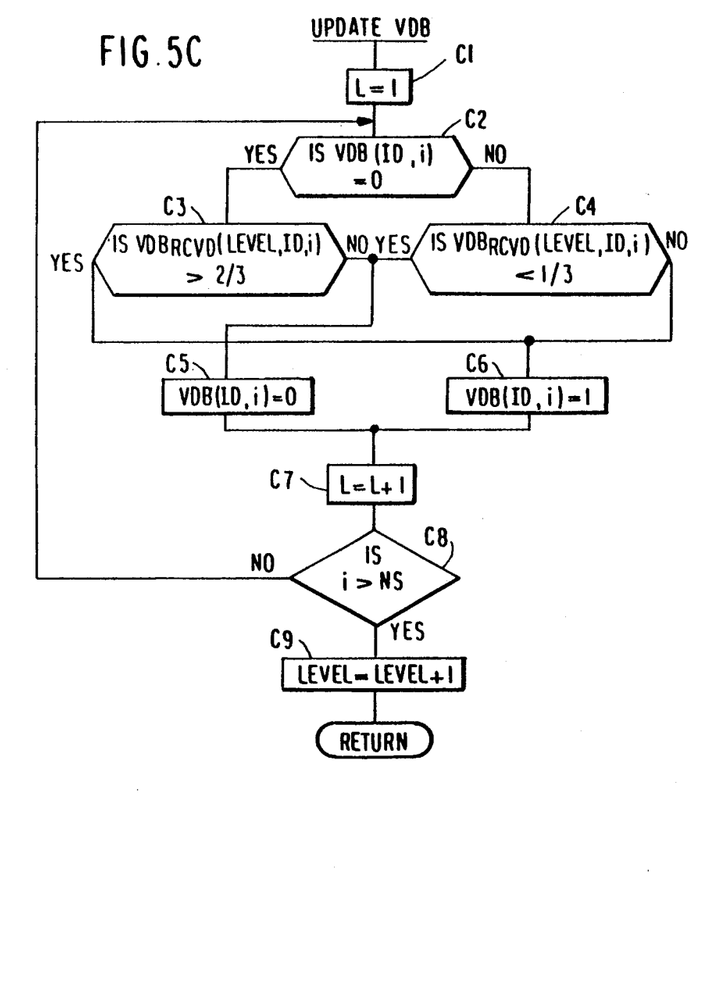
Figure 5D:
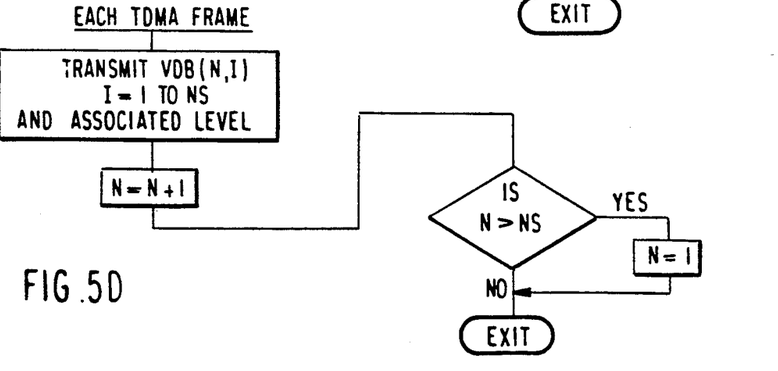

FIGS. 5B and 5C show the processing performed at each of the stations in order to create and update the VDB array.

Referring to FIG. 5B, function F5 initializes the process by setting the parameters ID equal to unity, the parameter LEVEL equal to zero and the parameter i equal to unity. Function F6 then refers to the entry in the $VDB_{rcvd}$ array at the location (level, ID, i). If the entry is non-zero, then processing skips to function F11 where that entry, and those accompanying it (for different values of i), are used to update the two-dimensional VDB matrix. In other words, one "line" of the three-dimensional matrix $VDB_{rcvd}$ is used to update corresponding elements of the two-dimensional VDB array. In addition, an entry is made into the "level" column of VDB corresponding to the element which is updated.

The detail processing of function F11 is shown in FIG. 5C. Function F11 (or the processing shown in FIG. 5C) is initiated on having identified a non-zero row in $VDB_{rcvd}$. As will become clear hereinafter, the processing of FIG. 5B is arranged so that the particular $VDB_{rcvd}$ row which is identified in function F6 is the lowest level having a non-zero entry. This "row" is then used to update the corresponding row in the VDB array. Initially, function C1 sets the parameter i to unity. Function C2 then checks the value of VDB (ID, i). If that value is zero, then the test C3 is performed on $VDB_{rcvd}$ (LEVEL, ID, i). The zero VDB entry will not be changed to unity unless the corresponding value in $VDB_{rcvd}$ is greater than two-thirds. If it is, function C6 is performed to set VDB (ID, i) equal to unity. On the other hand, if the value at $VDB_{rcvd}$ (LEVEL, ID, i) is less than two-thirds, then VDB (ID, i) will remain unchanged at the value zero via function C5.

On the other hand, if the value at VDB (ID, i) is non-zero, then the test of function C4 is performed. C4 tests $VDB_{rcvd}$ (LEVEL, ID, i) against the value one-third. Only if $VDB_{rcvd}$ (LEVEL, ID, i) is less than one-third will the unity value in VDB (ID, i) be changed to zero (see function C5). Otherwise, function C6 is performed which maintains VDB (ID, i) equal to unity. Thereafter, function C7 increments the parameter i. Function C8 tests i against NS. If i has not yet been incremented beyond NS, then processing loops back to function C2 to complete the processing of this row of the $VDB_{rcvd}$ array. When the entire row has been processed (and i has been incremented to be greater than NS - function C8), then function C9 is performed which writes the level of the VDB array (see FIG. 4) as one greater than the LEVEL of $VDB_{rcvd}$.

Following function F11, function F12 is performed to increment the ID and reset the level to zero (the reason for the latter function will become clear below) and set i = 1. Thereafter, function F13 checks to see if the entire $VDB_{rcvd}$ matrix has been reviewed by determining if ID has been incremented beyond the quantity NS. If not, processing loops back to function F6 (note, however, that on this pass the ID has been incremented as compared to the previous pass through this loop). If in processing function F6, it is determined that the particularly identified entry in $VDB_{rcvd}$ is zero, then function F7 is performed to increment the parameter i and function F8 checks to see if i has been incremented beyond NS. If it has not, processing loops back to function F6 (although note that at this time the parameter i has been incremented). If, in the course of executing function F8, it is determined that i has been incremented beyond NS, then function F9 is performed to reset the parameter i and to increment the parameter LEVEL. Function F10 checks to see if the parameter LEVEL has been incremented beyond the quantity NS−1. If it has not, then processing loops back to perform function F6 (in this type of pass, wherein functions F7–F10 are performed, both the parameters i and LEVEL have been incremented). In the event that LEVEL has been incremented beyond NS−1, then while a zero entry in $VDB_{rcvd}$ has been identified, nevertheless, it will be rewritten into the VDB array, as the most pertinent entry. It should be apparent that the loop of functions F6–F13 in effect search through the $VDB_{rcvd}$ in a way such as to identify non-zero entries at the lowest LEVEL, and those entries are used to maintain the VDB array. Once a particular "line" from $VDB_{rcvd}$ is used, the ID parameter is incremented in an effort to continue the search through the $VDB_{rcvd}$ array to identify non-zero entries. At the conclusion of the entire process of FIG. 5B (that is, when function F13 determines that ID is greater than NS), the search has been completed and the VDB array (including the LEVEL parameter) has been updated. Finally, function C10 decrements each element in $VDB_{rcvd}$. The decrementing process is provided to eliminate "stale" information. This is implemented by reducing or decrementing the value at each location in the $VDB_{rcvd}$ array by some predetermined quantity. Since all values in the $VDB_{rcvd}$ array lie between zero and unity, and since function C10 is performed once every NS frames, the quantity by which each location in the array is decremented determines the rate at which "stale" information is eliminated. In an embodiment which has been constructed, the quantity by which each location in $VDB_{rcvd}$ is decremented in function C10 has been selected as 1/16. As a result, it can take at most 16 * NS frames for an original unity value $VDB_{rcvd}$ of unity to be decremented to zero. Those skilled in the art will understand that parameters other than 1/16th can be employed to vary the rate at which "stale" information is decremented.

Figure 4:
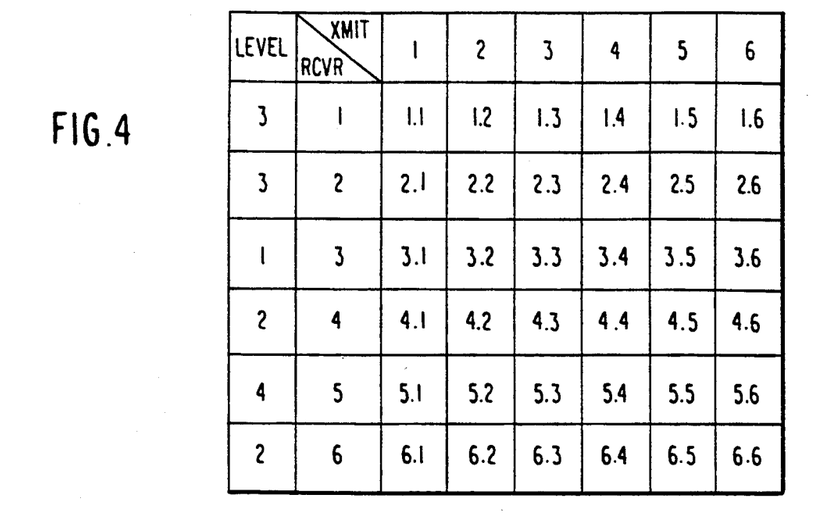
FIG. 4 illustrates the resulting two-dimensional VDB matrix.

Before referring to FIGS. 6A-6F to see how the information which has been collected in the array VDB is employed, reference is made to FIG. 4 to explore the contents of the VDB. FIG. 4 shows a typical VDB array. This two-dimensional array identifies different ones of the stations on the horizontal axis (columns) and vertical axis (rows). The data in the array is collected by the station identified by the row reflecting the identity of a station (specified by a column) from which a signal is received. Associated with each one of the different rows is a numerical quantity corresponding to the associated "level". The quantity in the "level" column identifies how direct or indirect is the information in the associated row. Each element of the array (other than the level column) as illustrated in FIG. 4 includes a representation in the form "x, y", wherein x and y are integers identifying respectively the receiving and transmitting stations. In actual practice, a VDB array would include a numerical quantity of either zero or one as each such element of the array. At any particular local station (LST), the row associated with that LST indicates direct visibility. For example, if the array of FIG. 4 were stored at station 3, then the row associated with station 3 would indicate the direct visibility of the other stations in the network to station 3. The other elements in the VDB array (elements other than on row 3) represent indirect visibility information. In order to provide other stations in the network with visibility information, each station transmits the contents of its VDB array. In a preferred embodiment, this transmission occurs in segments. For example, each station transmits one row of the VDB array in each burst, so that it takes as any bursts as there are rows in the VDB array to transmit the entire array. In an exemplary system wherein each station has one burst per frame, it takes as many frames as there are stations in the network to transmit the VDB array. In addition to transmitting the elements of the array, the transmission also includes the associated level data. The level data in the VDB array has been processed so that it is in a form usable at a station receiving the VDB transmission. Taking as an example the VDB array for station 3, the elements of the array in row 3 were acquired by station 3 directly, i.e. by determining whether or not it could hear the transmission from stations 1-6, respectively. That is level 0 information as entered in the $VDB_{rcvd}$. However, when that information is entered into the VDB array, it is entered with level 1. In other words, the level value from the $VDB_{rcvd}$ is incremented before it is stored in VDB.

Figures 6A, 6B:
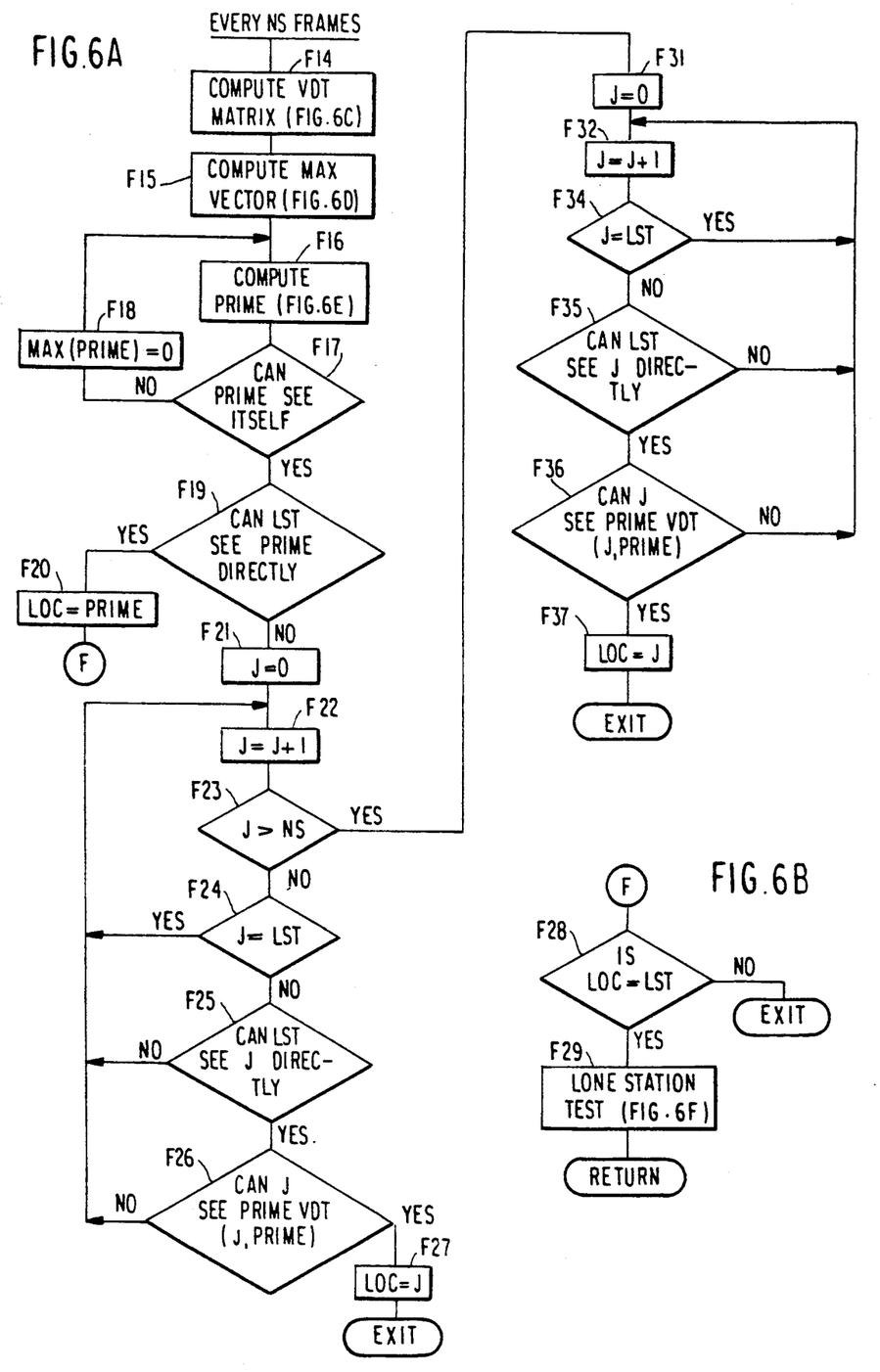
FIGS. 6A–6F illustrate the processing which is performed at each station to identify a new prime station and the station to which the station performing the processing will lock for timing purposes.

FIGS. 6A-6F illustrate the processing which is periodically performed to determine prime stations and the associated locking procedure. As shown in FIG. 6A, the initial steps provide for computation of a VDT matrix (F14 —see FIG. 6C), a max vector (F15—see FIG. 6D) and the identification of a prime station (F16—see FIG. 6E). Based on the results of this processing, the remaining portions of the functions in FIG. 6A identify the manner in which the station at which the computations are performed will lock its timing to the prime station, i.e. will that locking be direct or indirect and which station will be locked to?

Figure 6C:
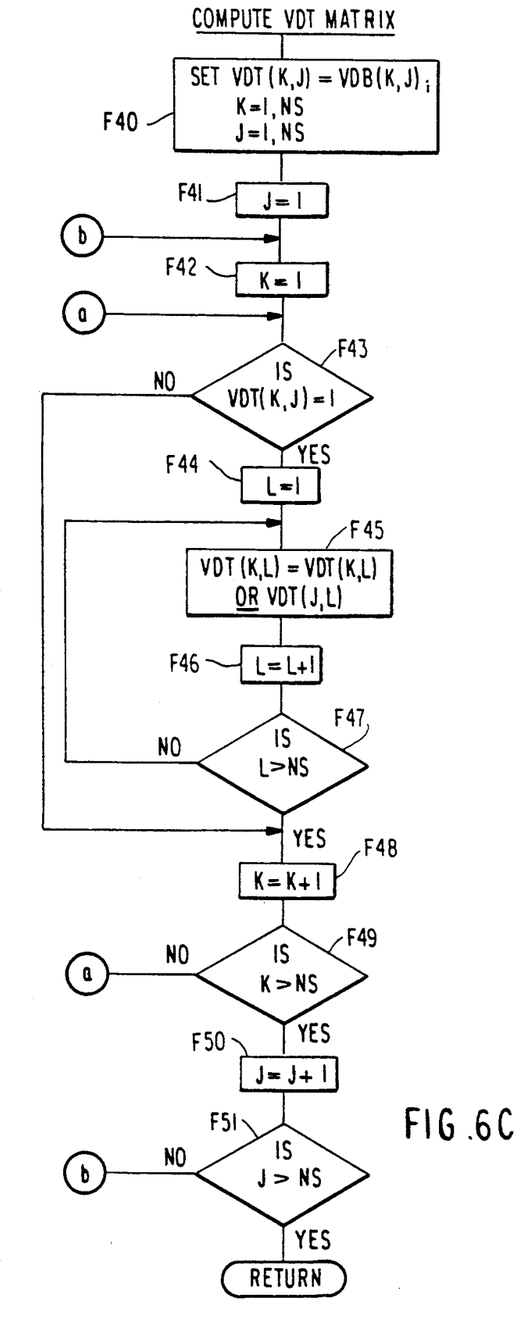

FIG. 6C illustrates computation of the VDT matrix. Function F40 initializes a VDT array by copying the VDB array. Whereas the VDB array identifies which stations can see each other directly (in other words, if station K does not see station J, then the entry VDB (K, J) will be zero), if station K can "see" station J indirectly, that is through one or more other stations, then the VDT (K, J) will be non-zero after the processing to be described. After having copied the VDB array into the VDT array, functions F41 and F42 are performed.

Functions F41 and F42 set the parameters J, K=1 and function F43 checks the now-loaded VDT array to determine if the entry at VDT (K, J)=1. If it is not, processing skips to function F48 where the parameter K is incremented. Thereafter, function F49 determines if we have incremented K throughout the number of stations in the network. Assuming we have not, processing loops back to function F43 to check this new location in the VDT array. This loop is repeated until either an entry in the VDT array which is equal to 1 is found (at function F43) or processing increments the parameter K through the number of stations. In that event, function F50 is performed to increment the parameter J. Thereafter, function F51 determines if J has been incremented through the number of stations in the network. If it has not, processing loops back to function F42 wherein the parameter K is reset to 1. It should be apparent that through this process, every entry in the VDT array is checked.

When an entry in the VDT array is determined (at function F43) to have the value unity, then function F44 is performed to set a further parameter L equal to unity. Thereafter, function F45 is performed to compute the logical OR function between VDT (K, L) and VDT (J, L).

Having performed function F45, function F46 is performed to increment the parameter L and thereafter function F47 is performed to determine if the parameter L has been incremented through the number of stations NS. If it has not, processing loops back to function F45 which is repeated using the now incremented parameter L.

The processing shown in FIG. 6C is arranged to compute, for every VDT element which is non-zero, the logical OR of VDT (K, L) and VDT (J, L) for L=1, NS.

Figure 6D:
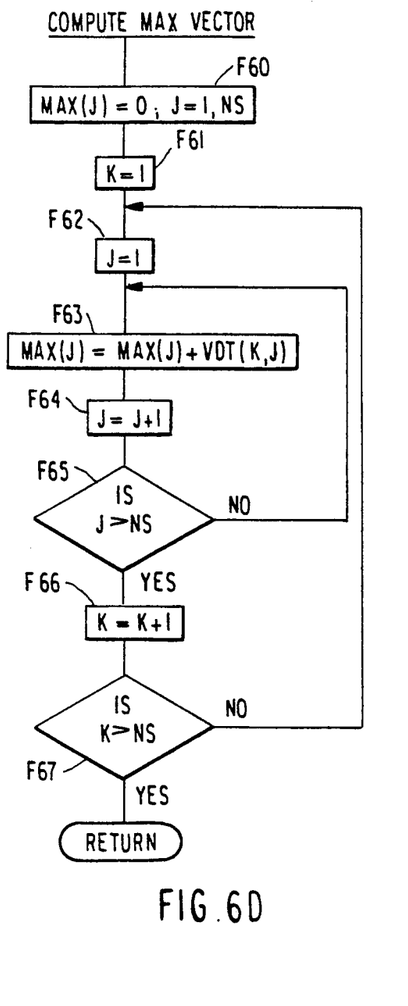

Having computed the VDT array for this particular pass, the next process (see FIG. 6A) is the max vector process of FIG. 6D. The max vector process produces:

$$MAX(J) = \sum_{K=1}^{NS} VDT(K,J); J = 1, NS$$

In other words, this process merely sums the entries in a particular column i producing MAX (i), and iterates the process for each column in VDT.

Function F60 (FIG. 6D) initializes max (J) as 0 for J=1, NS. Functions F61 and F62 initialize the parameters J and K as unity. Function F63 then computes max (J) as max (J) +VDT (K, J). Function F64 then increments the parameter J and function F65 determines if the parameter J has been incremented through NS. If not, function F63 is repeated. It will be seen that for a given K, function F63 will compute max (J). When function F65 determines that J has been incremented through NS, function F66 increments K. Thereafter, function F67 determines if the parameter K has been incremented through NS. If not, processing returns to function F62 where the parameter J is reinitialized at unity and the loop continues. The process returns (to the main line routine at FIG. 6A).

After the initializing steps (F60, F61 and F62), F63 performs the function of summing the values in a given "column" of the VDT. Refer, for example, to Table 1, Table 1 shows as an example VDB arrays which may be contained at four stations (station 1-station 4) and the associated VDT (directly below the VDB). Directly below the VDT, for each station, Table 1 also shows the associated max vector. Thus, for station 1, column 1, the max vector is unity, and the max vector for the second through fourth columns (again at station 1) is respectively 3, 2 and 4. When K has incremented past NS, then the max vector for each "column" has been computed and stored and the processing terminates.

Figure 6E:
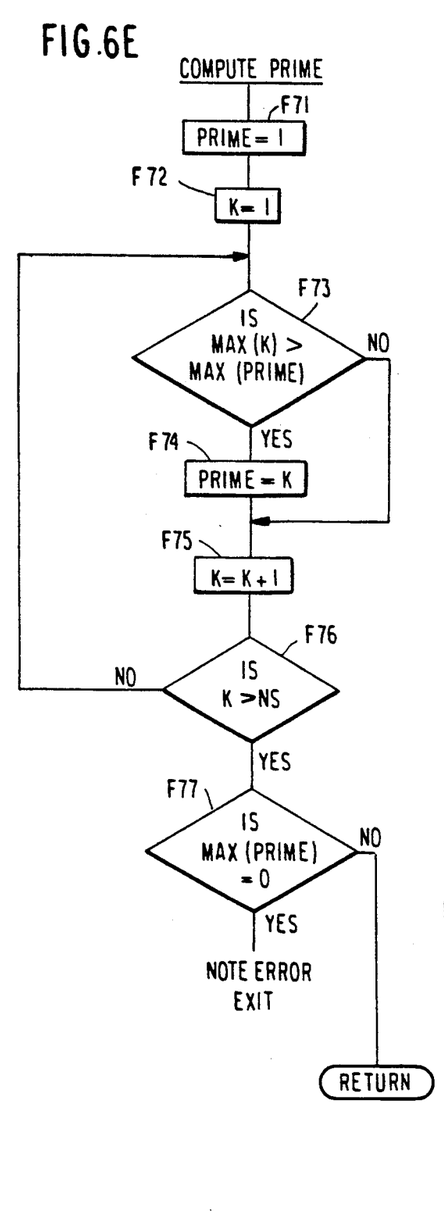

FIG. 6E shows how the prime station identity is computed. The initializing steps (F71 and F72) select a trial prime station as station 1 and initialize the parameter K at unity. Function F73 then compares max (K) to max (prime). If max (K) is not greater than max (prime), then K is incremented (function F75), and so long as K has not been incremented past NS, function F73 is repeated. If max (K) is greater than max (prime), then the prime candidate identity is changed to station K (F74), the parameter K is incremented (F75) and, assuming that K has not been incremented past NS, function F73 is again performed. This loop then will quickly identify the first element of MAX having the largest value. Function F77 thereafter determines if max (prime) is equal to zero. If it is not, then the prime station has been selected and processing returns to the main line processing (FIG. 6A). If, on the other hand, max (prime) is equal to zero, then processing exits with an error indication.

Assuming that at function F77 it takes the no exit, then processing picks up at function F17 (FIG. 6A). Function F17 determines if prime can see itself. Having identified prime as one of the stations in the conference, resolution of function F17 merely requires reference to the VDB to determine the element VDB (prime, prime). If at function F17 it is determined that prime cannot see itself, then function F18 is performed to write MAX (prime)=0 and return processing to the prime computation at FIG. 6E. Having written MAX (prime)=0 (at function F18), this will disqualify the previously identified prime station from being selected again.

On the other hand, if at function F17 it is determined that the prime station can see itself, then function F19 determines if LST can see prime directly. Again, this merely requires reference to the VDB, to determine the element VDB (LST, prime). Assuming that there is a positive response at function F19, then function F20 is performed to set LOC=prime. This means that the station LST will lock its TDMA timing to that of the prime station. Processing then steps through point F (see FIG. 6B). At this point, function F28 determines if LOC=LST. If for example LST were equal to prime, then function F28 would be satisfied. Otherwise, processing exits at this point, having completed identification of the prime station as well as identifying the station to which LST will be locked. On the other hand, if LOC equals LST, then the lone station test (F29) is performed. This processing is shown in detail in FIG. 6F.

The lone station test identifies whether there is any station (the lone station) which can only see itself. Using the "lone" station as a reference incorporates that lone station into the network and is to be preferred to leaving that station out of the network.

Figure 6F:
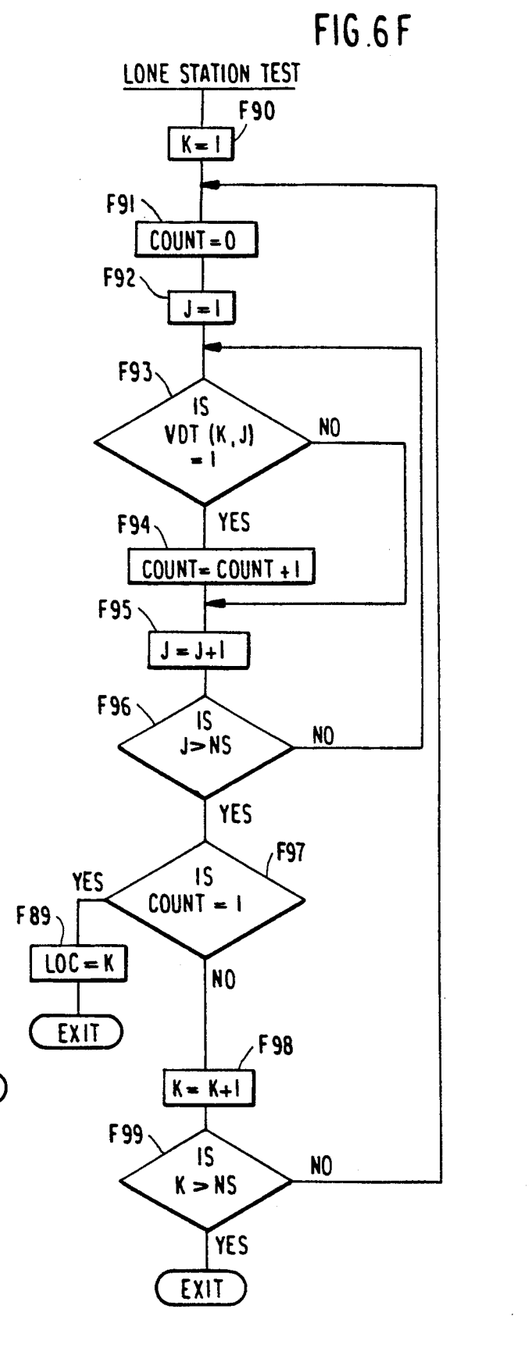

As shown in FIG. 6F, functions F90-F92 initialize three parameters. The parameters J and K are initialized at unity, the parameter COUNT is initialized at zero. Function F93 checks the value of VDT (K, J). If VDT (K, J) is not equal to one, then processing skips to function F95 to increment the parameter J. On the other hand, if VDT (K, J) is equal to one, the function F94 is first performed to increment the parameter COUNT. Thereafter, function F96 compares J to NS. If J is not greater than NS, processing loops back and function F93 is again performed. It will be apparent that this processing will be concluded with the parameter COUNT equal to the number of entries in VDT where the value is equal to one. When function F96 is satisfied, function F97 is performed to check if COUNT is equal to unity. If it is, then the "Yes" return path is taken. If COUNT=1, it found a station which can only see itself, i.e. the only unity entry in the VDT matrix was VDT (K, K)=1. As a result, F89 gets LOC=K, so as to lock TDMA timing, at LST, to station K. If COUNT≠1, then the station we have just examined can see more than itself and therefore function F98 is performed to increment K and look at a different station. Thus, the process is again repeated until K has been incremented past NS. In that case (refer to FIG. 6B) the processing leaves the identity of the station to which LST will be locked unchanged. On the other hand, the Yes return path implements function F89 to alter the locking station to K.

If, on the other hand, it is determined (F19) that LST cannot see prime directly, then processing continues.

This continued processing will identify the indirect locking path that will be used since LST cannot see prime directly. The processing of functions F21 through F27 is substantially identical to the processing for functions F31 through F37, with the difference that function F26 examines the VDB array whereas function F36 examines the VDT array. More particularly, functions F21 and F22 initialize the parameter J to unity. Function 23 checks to see if J has been incremented past NS. If not, function F24 determines if J=LST. If it is, processing loops back to function F22 to increment the parameter J. Function F25 is thus performed for a value J which is not equal to LST. Function F25 determines if LST can see J directly. This information is determined from the VDB array. Assuming it cannot, processing loops back to look at a different station by incrementing the parameter J. If LST can see J directly, then function F26 determines if J can see prime, again by reference to the VDB. If it cannot, processing loops back to function F22 to increment the parameter J. If J can see prime directly, then function F27 has determined the station to which LST will lock, i.e. J. If the processing of functions F22 to F26 is completed without performing function F27, then at some point function F23 will determine that J has been incremented past NS and function F31 is performed. Functions F31 and F32 are similar to functions F21 and F22. Thereafter, function F34 (like function F24) determines if J is LST. If it is, the parameter J is again incremented. Function F35 then determines if LST can see J directly. If it cannot, processing loops back to find a J which LST can see directly. Thereafter, function F36 determines if J can see prime in any way, i.e. by referring to the VDT. When a station is identified which can see the prime, then function F37 selects locking to that station.

Table 1 is an overview which illustrates the results of the foregoing processing at four stations in a four station network. Each of the four stations has its own column where the data generated thereat is shown. That data includes each station's VDB, VDT, the max vector, the prime station identified and the station to which LST will lock for frame reference purposes. In Table 2, the four stations are identified by number and the manner in which the frame reference information is derived at each of the other stations is indicated by identifying the station to which each is locked. More particularly, station 4 (which it will be noted cannot see any other station) locks to itself. Station 2 locks to station 4. Station 3 locks to station 2 and is thus indirectly locked to station 4 via station 2, and finally station 1 locks to station 3 and thus is indirectly locked to station 4 via stations 3 and 2, respectively.

TABLE 1

|  | Station 1 | Station 2 | Station 3 | Station 4 |
|---|---|---|---|---|
| VDB | 1010 | 0000 | 0000 | 0000 |
|  | 0101 | 0101 | 0101 | 0000 |
|  | 0110 | 0000 | 0110 | 0000 |
|  | 0001 | 0001 | 0001 | 0001 |
| VDT | 1111 | 0000 | 0000 | 0000 |
|  | 0101 | 0101 | 0101 | 0000 |
|  | 0111 | 0000 | 0111 | 0000 |
|  | 0001 | 0001 | 0001 | 0001 |
| Max Vector | 1324 | 0102 | 0213 | 0001 |
| Prime | 4 | 4 | 4 | 4 |
| Loc | 3 | 4 | 2 | 4 |

TABLE 2

| Station | Locked To |
|---|---|
| 1 | 3 |
| 2 | 4 |
| 3 | 2 |
| 4 | 4 |

Referring to Table 1, the information contained in each station's VDB will now be described. At station 1, the VDB indicates (in the first row) that station 1 can see itself (VDB (1, 1)), it cannot see stations 2 and 4, but it can see station 3. The second row of station 1's VDB reflects that station 1 has information that station 2 can see itself and station 2 can see station 4. The third row indicates that station 1 knows that station 3 can see station 2, and station 3 can see itself. Finally, the last row indicates that station 4 can see only itself. This information is then reflected in the VDT. The first row indicates that station 1 can see (either directly or indirectly) itself and stations 2, 3 and 4. The second row indicates that station 2 can see itself and station 4. The third row indicates that station 3 can see station 2, itself and station 4. Finally, the fourth row indicates that station 4 can only see itself.

This information results in the max vectors shown in Table 1 for stations 1–4 respectively as 1, 3, 2 and 4. This information results in station 4 being identified as a prime station (at station 1) and indicates that station 1 will lock to station 3.

Stations 2's VDB indicates that it has information that it can see itself (VDB (2, 2)) and station 4 (VDB (2, 4)). Furthermore, station 2 has information that station 4 can see itself. This information is reflected in the VDT and in the max vector 0, 1, 0, 2. This processing will produce the identification of station 4 as a prime station and station 4 as the station to lock to.

Station 3's VDB indicates that station 2 can see itself and station 4, that station 3 can see station 2 and itself and that station 4 can only see itself. Station 3's VDT indicates that station 2 can see station 2 or 4, that station 3 can see itself as well as stations 2 and 4 and that station 4 can only see itself. Thus the max vector at station 3 is 0, 2, 1, 3. This produces a prime identification at station 3 identifying station 4 as the prime station and results in station 3 locking to station 2.

Station 4's VDB indicates that it can only see itself, and the same information is reflected in the VDT. Thus, station 4's max vector is 0, 0, 0, 1. Station 4 identifies itself as the prime and identifies that it will lock to itself.

It should be apparent from the foregoing that by distributing VDB information among the stations in the conference, each of these stations can operate on that information, thereby producing VDT, max vector, prime and LOC information which will ensure a synchronized network without the exchange of further information.

As used herein, and in the prior art, the term network refers to a collection of stations which are connected in some fashion. In a TDMA system, an orbiting satellite is used which carries at least one transponder. In practice, satellites usually carry multiple transponders. Thus a TDMA system is also properly termed a network. A TDMA system will completely occupy at least one transponder. There are prior art TDMA systems which use multiple transponders. In such systems, there is a TDMA frame for each transponder, although timing of some of the frames may be controlled by the timing of other frames.

In this application, a TDMA system using a single transponder is termed a conference. While the stations in the conference may also use other transponders (on carrier frequencies different from the frequencies in use for the conference) the TDMA timing of the conference is not dependent on frames, or the frame timing related to other transponders.

However, it is within the spirit of the invention for the conference frame (or a component of the conference frame) to be used as a timing reference for frames of other transponders. In order to implement this variation, it is only necessary that stations which use the conference timing be capable of receiving the transmission of at least one station in the conference on the downlink carrier frequency of the conference.

It must be emphasized that this description has provided one example of an application of the invention in a TDMA network employing an orbiting transponder. Those skilled in the art are well aware that TDMA systems can employ transponders which are at locations outside an earth orbit and furthermore that while radio communications is exemplified herein, application of the invention is not restricted to use of a radio communication link. These and other changes may be made without departing from the scope of the invention, which is to be construed from the following claims.

We claim:

1. A method of collecting and distributing data useful for control of a TDMA conference of stations comprising the steps of:
   a) determining, a given station, which of the other stations in the conference have transmitted a signal which is received at the given station,
   b) receiving reports, at the given station, respecting the visibility of stations in the conference to stations other than the given station,
   c) combining the information collected in steps a) and b),
   d) processing said combined information and transmitting said processed information from the given station to others of the stations in the conference.

2. A method as recited in claim 1 wherein said steps a)–d) are also carried out by stations in the conference other than said given station.

3. A method as recited in claim 1 wherein said steps a)–d) are carried out by each station in the conference.

4. A method as recited in claim 1 wherein said step c) includes
   c1) establishing a three dimensional array at the given station with one axis devoted to receiving stations, a second axis devoted to transmitting stations and a third axis devoted to levels of indirection,
   c2) inserting information, derived in step a) into said three dimensional array in a zero$^{th}$ level, and
   c3) inserting information, derived in step b) into said three dimensional array in levels other than said zero$^{th}$ level.

5. A method as recited in claim 4 in which said step c2) includes incrementing a value, but only up to a first limiting value, in said zero$^{th}$ level by a first predetermined quantity on each occasion a burst is received at the given station.

6. A method as recited in claim 5 in which said step c2) includes decrementing a value, but only down to a second limiting value, in said zero$^{th}$ level by said first predetermined quantity on each occasion a burst is not received at the given station.

7. A method as recited in claim 4 in which said step c3) includes incrementing a value, but only up to a first limiting value, in a level other than a zero$^{th}$ level by a first predetermined quantity on each occasion a report is received from another station indicating visibility between a pair of stations.

8. A method as recited in claim 4 in which said step c3) includes decrementing a value, but only down to a second limiting value, in a level other than a zero$^{th}$ level by a first predetermined quantity on each occasion a report is received from another station indicating lack of visibility between a pair of stations.

9. A method as recited in claim 4 in which said step d) includes periodically decrementing each value of said three dimensional array by a selected quantity.

10. A method as recited in claim 4 in which said step d) includes:
    d1) establishing a two dimensional array with one axis devoted to receiving stations and a second axis devoted to transmitting stations and providing a level value associated with each different receiving station appearance in said two dimensional array,
    d2) testing elements of said two-dimensional array and thereafter transferring selected information from said three dimensional array to said two dimensional array, data in said two dimensional array comprising said processed information.

11. A method as recited in claim 10 wherein said step d2) includes:
    d21) altering an existing value in said two dimensional array based on a corresponding value in said three dimensional array only if the value in said three dimensional array indicates, based on a hysteresis function, a change in state of a condition indicated by the existing value of said two dimensional array.

12. In a TDMA conference of stations, a method of selecting a prime station for determining TDMA timing for the conference comprising the steps of:
    a) determining, at a local station (LST) in the conference, which of the other stations in the conference have transmitted a signal which is received at LST,
    b) receiving reports, at LST, respecting visibility of stations in the conference to stations other than LST,
    c) combining, at LST, information collected in steps a) and b), processing said combined information and transmitting said processed information to others of the stations in the conference,
    d) repeating said steps a)–c) at each of the other stations in the conference, and
    e) at each of the stations, periodically identifying a prime station from information collected in steps a)–d).

13. A method as recited in claim 12 wherein step c) includes periodically transmitting said processed information to other stations in the conference.

14. A method as recited in claim 13 in which the information transmitted in step c) is transmitted in segments, one segment per frame, and wherein information respecting a conference of N stations requires a period of N frames, where N is an integer greater then unity.

15. A method as recited in claim 14 wherein the period of step e) is N frames.

16. A method as recited in claim 12 which includes the further step of determining at a given station, which station to lock to for determining TDMA timing.

17. A method as recited in claim 12 which includes the further step of determining at each station, which station to lock to for determining TDMA timing.

18. A method as recited in claim 13 wherein said step c) includes the steps of:
    c1) establishing a two dimensional visibility array (VDB) with one axis devoted to receiving stations and another axis devoted to transmitting stations, and
    c2) filling said two dimensional visibility array (VDB) with said combined information in binary form, representing either direct visibility or lack of direct visibility 19. A method as recited in claim 18 wherein said step e) includes the steps of:
    e1) establishing a two dimensional total visibility array (VDT) with one axis devoted to receiving stations and another axis devoted to transmitting stations,
    e2) filling said two dimensional total visibility array (VDT) with information from said two dimensional visibility array (VDB).
    e3) replacing any element (VDT(K,L)) of said two dimensional total visibility array with the logical function VDT(K,L) @ VDT(J,L), where @ represents a logical OR function and J,K,L represent different stations in the conference, so that an element VDT(J,K) represents direct or indirect visibility or lack of direct or indirect visibility.

20. A method as recited in claim 19 wherein said step e) further includes the steps of:
- e4) determining from said two dimensional total visibility array (VDT) which of the stations in the conference is directly or indirectly visible to the largest number of receiving stations in the conference,
- e5) identifying said determined station as the prime station.

21. A method as recited in claim 20 including the further steps of:
- e7) determining from said two dimensional visibility array (VDB) whether the prime station is visible to said station LST and either
- e71) selecting a timing lock to said prime station at said station LST if the prime station is visible to the station LST or
- e72) selecting a timing lock to an intermediate station, said intermediate station selected from said two dimensional total visibility array (VDT) as an intermediate station which is visible to the station LST and at which the prime station is visible.

22. A method of controlling timing in a TDMA system having a plurality of stations in a TDMA conference, the method comprising the steps of:
- a) collecting information at a given station LST concerning other stations directly visible at the station LST,
- b) receiving reports from other stations concerning visibility information available at the other stations,
- c) combining the visibility information of steps a) and n) and processing the combined information to produce at the station LST a direct visibility array (VDB),
- d) transmitting from the station LST the direct visibility array (VDB) to other stations in the system, and
- e) determining, at the station LST, from the direct visibility array (VDB), whether the station LST will lock its TDMA timing to another station in the system, and if it will, the identify of such other station.

23. A method as recited in claim 22 wherein step e) includes the steps of:
- e1) computing a total visibility array (VDT) representing direct and indirect visibility based on the direct visibility array (VDB),
- e2) determining from the total visibility array (VDT), which of the stations in the conference is directly or indirectly visible to the largest number of receiving stations in the conference.
- e3) selecting the station determined in step e3), above, as a prime station,
- e4) if LST is not the prime station, determining whether the prime station is visible to LST,
    - e41) if it is then determining to lock LST TDMA timing to the prime station and
    - e42) if the prime station is not visible to LST, then identifying an intermediate station or stations through which the prime station is visible to LST and determining to lock LST TDMA timing to the intermediate station visible to LST.

* * * * *

UNITED STATES PATENT AND TRADEMARK OFFICE
CERTIFICATE OF CORRECTION

PATENT NO. : 5,315,589

DATED : May 24, 1994

INVENTOR(S) : W. Robert Kepley, Stanley E. Kay, Ashim Roy, Steven M. Kee, Carle C. Henson, III, Adrian J. Morris, and Randy Drago It is certified that error appears in the above-identified patent and that said Letters Patent is hereby corrected as shown below:

In column 17, claim 1, line 4, the text should read as follows:

after "determining," please add the word --at--.

In column 20, claim 22, line 10, the text should read as follows:

please delete "n)" and add the letter --b)--.

Signed and Sealed this

Seventh Day of March, 1995

*Attest:*

BRUCE LEHMAN

*Attesting Officer*  *Commissioner of Patents and Trademarks*